United States Patent [19]

Hardt et al.

[11] 4,054,615
[45] Oct. 18, 1977

[54] HIGH IMPACT TERNARY BLEND PVC MOULDING COMPOSITIONS

[75] Inventors: Dietrich Hardt, Cologne; Gert Humme, Odenthal; Karl-Heinz Ott, Leverkusen; Hans-Eberhard Braese, Cologne, all of Germany

[73] Assignee: Bayer Aktiengesellschaft, Leverkusen, Germany

[21] Appl. No.: 719,247

[22] Filed: Aug. 31, 1976

[30] Foreign Application Priority Data

Sept. 6, 1975 Germany .................. 2539719

[51] Int. Cl.$^2$ .................................. C08L 51/04
[52] U.S. Cl. ........................ 260/876 R; 260/884; 260/887; 260/889; 260/892; 260/899
[58] Field of Search ............. 260/876 R, 884, 887, 260/889, 892, 899

[56] References Cited

U.S. PATENT DOCUMENTS

| 3,819,554 | 6/1974 | Blanchard | 260/876 R X |
|---|---|---|---|
| 3,851,016 | 11/1974 | Nicolet et al. | 260/876 R X |
| 3,876,727 | 4/1975 | Meredith et al. | 260/878 |
| 3,959,211 | 5/1976 | Cooper et al. | 260/876 X |

*Primary Examiner*—Murray Tillman
*Assistant Examiner*—T. DeBenedictis, Sr.
*Attorney, Agent, or Firm*—Connolly and Hutz

[57] ABSTRACT

Thermoplastic moulding compositions of
  A. 65 to 95% by weight polyvinyl chloride or vinyl chloride copolymer having K-values of 50 to 80,
  B. 2 to 25% by weight of a chlorinated polyolefin or of a chlorinated olefin copolymer with a chlorine content of 20 to 80% by weight,
  C. 3 to 30% by weight of a graft polymer produced by grafting styrene or styrene and acrylonitrile and optionally copolymerizable monomers onto an EPDM rubber as graft base.

16 Claims, No Drawings

HIGH IMPACT TERNARY BLEND PVC MOULDING COMPOSITIONS

The invention relates to thermoplastic moulding compositions containing predominantly polyvinyl chloride having a high impact strength and notch impact strength, excellent processing properties and high stability to light and ageing. The compositions comprise polyvinyl chloride or vinyl chloride copolymers, chlorinated polyolfins or chlorinated olefin copolymers and graft polymers of styrene or styrene and acrylonitrile and optionally monomers copolymerizable therewith onto an EPDM-rubber (ethylene-propylene-diene-monomer) as the graft base.

Polyvinyl chloride is a widely used plastic with a number of favorable technological properties. However, it breaks very easily particularly at low temperatures. It is therefore necessary to improve its toughness, which is basically possible by the addition of suitable polymers (or reaction of the vinyl chloride or polyvinyl chloride with such polymers). A series of additional requirements are made of such "high impact modification" or "high impact modifier," namely:

1. small quantities of the modifiers must suffice;
2. the good properties of the polyvinyl chloride should not be adversely affected;
3. the modifiers must be incorporated into the polyvinyl chloride easily;
4. the modifiers must be stable towards light and ageing if the polyvinyl chloride is to be used in the open over a long period;
5. when the high impact polyvinyl chloride is processed its toughness must also be constant when the processing conditions vary (e.g., temperature, time, shearing effects);
6. light transmission and transparency must not be impaired;
7. conventional additives and stabilizers must be usable;
8. the high impact modifiers must be physiologically acceptable.

The retention of toughness during the thermoplastic processing is also of particular importance. High impact polyvinyl chlorides are almost always 2-phase systems of a polyvinyl chloride matrix with a discontinuous elastomeric phase; thus in thermoplastic processing there is always danger of break-down of this system due to high processing temperatures or prolonged shearing (which always occur in actual processing). Therefore, the effect and processing behavior of an elastomeric compound added as an impact modifier to polyvinyl chloride, respectively of an elastomer modified thermoplast are the better, the more stable the mixture is against break down of the 2-phase structure caused by processing.

Of the commercially used impact modifiers for polyvinyl chloride, chlorinated polyolefins or chlorinated olefin copolymers are particularly useful. These products are very good elastifiers, however, toughness decreases upon prolonged heating or shearing. Therefore careless processing or severe processing conditions (e.g., high through-put, intensified stirring, high processing temperature), may yield faulty compositions with insufficient toughness.

It has now been found that the stability to processing of high impact mixtures of PVC with chlorinated olefins or chlorinated olefin copolymers is improved decisively by adding graft polymers of styrene, or styrene and acrylonitrile, and optionally monomers copolymerisable therewith onto an EPDM-rubber (ethylene/propylene/diene-monomer) as the graft base. In this way high impact PVC compositions are obtained, which are distinguished by improved processing properties at higher temperatures without reduction of notch impact strength. In addition the inherently problematical processing of PVC with the chlorinated polyolefins is noticeably improved. In particular, extrusion products have improved surfaces and better homogenization of the mixture component; thus the uniformity of the production charges is improved.

Graft polymers of vinyl chloride on chlorinated polyolefins or chlorinated olefin copolymers can also be improved with the described EPDM graft polymers. Finally, vinyl chloride can also be grafted onto mixtures of chlorinated polyolefins or chlorinated olefin copolymers with graft polymers of styrene or styrene-acrylonitrile on EPDM rubbers.

In all cases, thermoplastic compositions which are of the high impact PVC type are obtained, which exhibit the desired mechanical properties of an elastomeric PVC, are easy to process and have favorable light and ageing stability. Their decisive advantage is that they can be processed at increased temperatures and sustain temperature changes over longer periods without loss of toughness.

The invention, therefore provides thermoplastic moulding compositions of:
A. 65 to 95% by weight polyvinyl chloride or vinyl chloride copolymers with K-values of 50 to 80;
B. 2 to 25% by weight of a chlorinated polyolefin or of a chlorinated olefin copolymer having a chlorine content of 20 to 60% by weight; and
C. 3 to 30% by weight of a graft polymer produced by grafting styrene, or styrene and acrylonitrile and optionally monomers copolymerizable therewith onto an EPDM rubber as the graft base.

Particular preference is given to thermoplastic moulding compositions consisting of:
A. 65 to 95% by weight of polyvinyl chloride with a K-value of 50 to 80;
B. 2 to 25% by weight of a chlorinated polyethylene-propylene copolymer with a chlorome content of 25 to 45% by weight; and
C. 3 to 30% by weight of graft polymers of styrene and acrylonitrile on an EPDM rubber, which as a diene component contains 5-ethylidene-norbornene-2, dicyclopentadiene or 1,4-hexadiene and has been produced by solution polymerization.

EPDM-GRAFT POLYMERS

EPDM graft polymers in this context are obtained by polymerization of graft monomers in the presence of the pre-formed EPDM rubber. In principle it is possible to use all known polymerization processes (emulsion, solution, bulk, suspension or precipitation polymerization) and combinations thereof.

EPDM-RUBBER, GRAFT BASE

"EPDM rubbers" in the context of the invention are copolymers of ethylene, propylene and an unconjugated diene. The ethylene/propylene weight ratio can be from 75 : 25 to 40 : 60. The diene is incorporated in such quantities and in such a form in the terpolymer that iodine numbers of 2 to 30 are found, corresponding approximately to 1 to 15, preferably 1 to 1.5 C=C- bonds per 1000 C-atoms. The monomeric structural elements can be arranged statistically or in blocks. Instead of one diene, mixtures of different dienes can also be used.

Preferred dienes are: dicyclopentadiene, 1,4-hexadiene and 5-ethylidene-norbornene-2. Also suitable are homologues thereof, e.g., alkylidiene-norbornenes, tricyclopentadiene, heptadiene and octadiene.

Particular preference is given to EPDM rubbers having a Mooney plasticity (ML 1+4', 100° C) of from 20 to 150.

GRAFT MONOMERS, GRAFT POLYMER

Graft monomers in this context are styrene, mixtures of styrene and acrylonitrile; methylmethacrylate, and mixtures of styrene acrylonitrile and methylmethacrylate. Styrene can be wholly or partially replaced by α-methyl styrene.

Preferance is given to mixtures of styrene and acrylonitrile, to which the following applies:

$$1 < \frac{\text{Weight of styrene}}{\text{Weight of acrylonitrile}} < 9$$

preferably $$1.5 < \frac{\text{Weight of styrene}}{\text{Weight of acrylonitrile}} < 4$$

For the weight ratio of graft base to graft monomer, the following applies:

$$0.33 < \frac{\text{Graft base}}{\text{Graft Monomer}} < 4$$

preferably $$0.5 < \frac{\text{Graft base}}{\text{Graft monomer}} < 2.5$$

GRAFT POLYMERIZATION

Graft polymerization is the polymerization of the graft monomers in the presence of the graft base. In this process, a part of the monomers is polymerized as a side chain onto the graft base. This part of the polymer formed is chemically bound to the graft base. In addition, a free polymer of the graft monomer is formed. The weight ratio of the polymer chemically bound (grafted) to the graft base to the free polymer is termed the degree of grafting. This degree of grafting and the molecular weight both of the grafted and the free polymer can be greatly influenced by the polymerization conditions (temperature, activation, molecular weight control, solvent agitation conditions and monomer quantities). Thus, to obtain products with optimum properties the polymerization conditions must be carefully selected.

Selection of polymerization activator, polymerization speed and polymerization temperature are interdependent. For a given polymerization temperature, suitable activators can be selected using the half life times given in the literature and vice versa. Temperatures of at least 80° C are required for the graft polymerization, preferably 100° to 140° C, particularly preferably 110° to 130° C.

Peroxide-activators such as di-tert.-butylperoxide, cumene hydroperoxide, tert.-butylhydroperoxide, dicumylperoxide are particularly suitable.

In the case where reducing agents are added it is possible to use activators of which the speed of decomposition at the specified temperatures is too low.

Molecular weight regulators which can be used include: long-chain mercaptanes, terpinolenes and α-olefins.

In the context of this invention, solution polymerization is preferred as the polymerization process, preferably in aromatic hydrocarbons having a boiling point (bp$_{760}$) of 80° to 150° C. Benzene and toluene are preferred.

It is preferable to work at concentrations, i.e., at a weight ratio of solvent: graft monomer plus graft base of 2.5 : 1 to 10 : 1, for benzene the ratio is preferably ≦10 and for toluene <5.

ISOLATION OF THE EPDM-GRAFT POLYMER

Preference is given to steam stripping and evaporation in evaporation screws.

CHLORINATED POLYOLEFINS OR CHLORINATED OLEFIN COPOLYMERS

Chlorinated polyolefins in this context are predominantly olefin copolymers produced by the low pressure process or olefin copolymers, in particularly polyethylene, ethylene/propylene copolymers or ethylene/propylene-diene-copolymers with molecular weights (MG) of 10,000 to 2,000,000, which are subsequently chlorinated so that the chlorine content is between 20 and 60% by weight, preferably between 25 and 45% by weight. In addition, mixtures of chlorinated olefins or chlorinated olefin copolymers can be used. Chlorinated polyolefin or olefin copolymers of the composition claimed are for example described in German Auslegeschriften Nos. 1,163,535, 1,045,089 and 2,260,525.

POLYVINYL CHLORIDE

Suitable are, i.a., polymers of vinyl chloride obtained by suspension, emulsion or bulk polymerization, of which the K-value according to Fikentscher (H.F., Zeitschrift fuer Zellulose-Chemie 13 (1932) page 58) is 50 to 80 and copolymers of at least 80% by weight vinyl chloride and up to 20% by weight further polymerized monomers. Other monomers, which can be used individually or in mixtures are for example: ethylene, propylene, butylene, vinyl-esters of monocarboxylic acid, anhydrides thereof or simple and substituted amides, acrylic acid and methacrylic acid esters and vinylidene chloride.

PRODUCTION OF THE MOULDING COMPOSITIONS

Conventional rapid mixers and rollers are suitable for mixing and preparing. The starting material is in powder form or granulated. The compositions plastified on rollers or kneaders can also be pressed or calandered. Powder mixtures and granulates can be extruded, injection-moulded or blow-moulded according to known methods.

The moulding composition according to the invention can contain conventional stabilizers, i.e., stabilizing systems based on lead, barium/cadmium, calcium/zinc, tin-organic compounds or organic stabilizers, e.g., α-phenylindol, diphenylthiourea, α-aminokrtonic ester, epoxidated fatty acid ester alone or in combination. Lubricants for polyvinyl chloride can also be added.

Polymer and monomer plasticizers can be added to the moulding compositions individually or in combination as well as physical or chemical blowing agents (in order to obtain a foam structure) under suitable processing conditions.

The addition of conventional processing and flow auxiliary agents is also possible as in the processing of pure or high impact polyvinyl chloride. Antistatic agents, UV-absorbers, antioxidants, flame retardants, pigments and fillers can be used.

In the production of the high impact moulding compositions according to the invention preference is given to the use of sufficient EPDM graft polymer and chlorinated olefin copolymer so that the total content of the mixture of elastomeric components, i.e., the sum of chlorinated olefin polymer and EPDM rubber, is between 5 and 20% by weight of the total mixture in the graft polymer. Instead of pure EPDM graft polymers, mixtures of the graft polymers with copolymers of the graft monomers can also be used. The use of mixtures of different chlorinated olefin polymers or olefin copolymers is also possible.

PROPERTIES AND APPLICATIONS OF THE MOULDING COMPOSITIONS ACCORDING TO THE INVENTION

The compositions according to the invention are thermoplastically mouldable and constitute hard but very tough products of the type of the high impact polyvinyl chloride. They are very tough even at temperatures of up to −40° C. Hardness, tensile strength, bending strength and E-modulus correspond to the requirements of polyvinyl chloride.

The moulding compositions can be processed at temperatures up to 240° C and are thus substantially more resistant to processing than conventional impact resistant polyvinyl chloride.

Finally they possess good stability to light and ageing.

The moulding compositions are used primarily for making sections and extruded plates and injection moulded articles. Sections are used particularly in the building industry and in furniture construction. Examples which might be mentioned are: window sections, door frames, balcony cladding, gutters, street railings, stair edges, curtain rails, fence slats, bench sections, different types of files for wall cladding, etc. By means of the injection moulding method it is possible to produce for example household and other commodities, small parts for the motor industry, housings for office machines and electrical equipment and furniture and furniture parts. Rolled sheets can be used in the packaging sector, and there are possibilities for the use of specially pigmented and patterned sheets in the furniture sector as veneering and covering materials. Impact-resistant bottles can be produced by the extrusion blowing method.

EXAMPLES

The following polymers are used as starting materials for the Examples:

1. Production of EPDM graft polymers

The production of EPDM graft polymers takes place according to the following general composition:

| In | L parts by weight solvent |
| there are dissolved | E parts by weight EPDM rubber |
| | S parts by weight styrene |
| | A parts by weight acrylonitrile |
| and the solution is heated to | T ° C (= polymerisation temperature) |
| After the addition of | |

| -continued | |
|---|---|
| the mixture | J parts by weight initiator |
| is polymerised for at the | t hours |
| above polymerisation temperature | T ° C |

The monomer conversion achieved is greater than 98%. To the polymer solution there is added relative to the sum E + S + A + M, 0.5 parts by weight of a phenolic anti-oxidant (2,6-di-tert.-butyl-p-cresol) and 0.5 parts by weight of a co-stabilizer (dilaurylthiodipropionate) and the polymer product is isolated by stripping. The resultant crumbly substance is dried at 70° C in a vacuum drying cabinet.

| Polymerisation vessel: | V2A-steel, loadable up to 6 bars, wall-sweeping agitator passing designed for viscosities > 1,000 poise. |
|---|---|
| Stripper: | Commercial stripper used in rubber technology. |

The various EPDM graft polymers are compiled in table 1.

As the monomer conversion is ≧ 98% it is assumed for further discussion, that the rubber content of the graft polymer = EPDM-rubber quantity used (E) during the graft reaction.

| No: of EPDM graft polymer | 1 | 2 | 3 | 4 |
|---|---|---|---|---|
| Solvent (L) *) | | | | |
| Type | B | T | T | B |
| Quantity | 500 | 300 | 275 | 500 |
| EPDM-rubber (E) | | | | |
| Rubber quantity | 45 | 45 | 35 | 70 |
| diene component **) | DCPD | EN | DCPD | EN |
| Iodine number | 12 | 24 | 12 | 24 |
| Mooney-value (ML1 + 4', 100° C) | 70 | 90 | 70 | 90 |
| Name of commercial product | Buna AP321 | Buna AP451 | Buna AP321 | Buna AP451 |
| Graft monomer | | | | |
| Styrene (S) | 41.3 | 41.3 | 48.75 | 22.5 |
| Acrylonitrile (A) | 13.7 | 13.7 | 16.25 | 7.5 |
| Polymerisation temperature | (T) 120 | 120 | 120 | 120 |
| Initiator (J) ***) | | | | |
| Peroxide | DTBP | DTBP | DTBP | DTBP |
| Quantity | 0.9 | 0.9 | 0.9 | 0.47 |
| Polymerisation duration (t) | 14 | 14 | 14 | 14 |

*) B = Benzene, T = Toluene
**) EN = 5-ethylidene-norbornene-2 DCPD = dicyclopentadiene
***) DTBP = Di-tert.-butylperoxide 2. Polyvinyl chloride For the production of the thermoplastic moulding composition, a suspension of PVC having a K-value of 68 is used (Commercial product: Vestolit VS 6858, Chemische Werke Huels). This S-PVC is pre-stabilized as described below and subsequently further processed to form the PVC moulding compositions according to the invention.

The production of the PVC stabilized with a tin compound is as follows:

Polyvinyl chloride - type Y 100 parts by weight suspension-polyvinyl chloride having a K-value of 68 are mixed with 1.5 parts by weight di-n-octyl tin thioglycolic acid ester in a rapid mixer for 5 minutes at 2,000 RPM, and the temperature rises to 120° C. Subsequently the mixture is cooled at reduced agitator speed to room temperature.

3. Chlorinated polyethylene

For the production of the mixtures according to the invention, the following chlorinated polyethylenes are used:

CPE 1

Chlorinated polyethylene with a chlorine content of 30% by weight and a Mooney viscosity (100° C) of ML4 = 70 (test according to DIN 53523). This is Elaslen 301 A of Messrs. Showa Denko.

CPE 2

Chlorinated polyethylene with a chlorine content of 35% by weight and a Mooney viscosity (100° C) of ML4 = 75 (test according to DIN 53523). This is Elaslen 351 A of Messrs. Showa Denko.

CPE 3

Chlorinated polyethylene with a chlorine content of 33.8% by weight CPE XP 5335.02 of DOW-chemicals.

CPE 4

Chlorinated polyethylene with a chlorine content of approximately 27% by weight and a Shore-Hardness D of 36. Lutrigen KR 3902 of BASF.

4. Production of the mixtures according to the invention.

The polymer mixtures according to the invention are prepared with the pre-stabilized polyvinyl chloride type Y according to the following method.

On a laboratory calander, the stabilized polyvinyl chloride, the particular EPDM graft polymer used and/or the particular chlorinated polyethylene used are homogenized in the mixture ratio specified in the Examples, drawn out to form rolling sheets and pressed into test pieces. For the production of the rolling sheet, naturally a mixture of PVC, stabilizer system and impact resistant modifier can be applied directly on to the roller.

Unless otherwise mentioned, the mixtures are in each case intensively mixed for 10 minutes on a calander at 180°, 190° and 200° C and subsequently in each case at the same temperature as mentioned above preheated without pressure on a press for 7 minutes and pressed for a further 3 minutes under pressure to form sheets, which are used for the production of test pieces corresponding to standards.

5. Mechanical testing

The mechanical tests on the polymer blends were carried out according to the standards quoted below:

Impact strength $a_n$, DIN 53453 (kJ/m$^2$) Temperature: room temperature (RT)

Notch impact strength $a_k$, DIN 53453 (kJ/m$^2$) room temperature (RT)

Vicat temperature: DIN 53460 (° C), method B

Bending tension bf: DIN 53452 (M Pa)

Ball pressure hardness $H_{c,30''}$: DIN 53456 (M Pa)

EXAMPLE 1

As can be seen from the present Example, the notch impact strength of the PVC/CPE compound at 13 kJ/m$^2$ is very low and in the event of temperature loading decreases sharply and rapidly in the PVC range. However with the addition of EPDM/SAN graft polymer, with an increasing quantity of this component, both the strength and the finishing resistance are improved.

| No. | Description of starting products | Parts by weight | $a_k$,RT (kJ/M$^2$) | $H_c$ 30" (MP a) | Vicat (° C) | ΣbF (MPa) | Processing temperature. (° C) |
|---|---|---|---|---|---|---|---|
| I A | PVC-Type Y | 94 | 13 | 109.0 | 81 | 85.2 | 180 |
|   | CPE 1 | 6 | 8 | 111.5 | 80 | 86.4 | 190 |
|   |   |   | 4 | 116.0 | 79 | 87.9 | 200 |
| I B | PVC-Type Y | 92.2 | 19 | 105.7 | 81 | 81.9 | 180 |
|   | CPE 1 | 4.5 | 15 | 109.3 | 80 | 83.2 | 190 |
|   | EPDM 1 | 3.3 | 10 | 105.9 | 79 | 84.6 | 200 |
| I C | PVC-Type Y | 90.3 | 31 | 106.3 | 81 | 83.5 | 180 |
|   | CPE 1 | 3.0 | 30 | 107.8 | 81 | 83.4 | 190 |
|   | EPDM 1 | 6.7 | 27 | 107.9 | 80 | 84.1 | 200 |
| I D | PVC-Type Y | 88.5 | 38 | 103.1 | 81 | 80.4 | 180 |
|   | CPE 1 | 1.5 | 34 | 104.0 | 81 | 82.1 | 190 |
|   | EPDM 1 | 10.0 | 40 | 106.9 | 79 | 81.4 | 200 |

$a_n$. RT (kJ/m$^2$) all samples unbroken

EXAMPLE 2

This example shows that in the event of a variation of the EPDM/SAN graft polymers and of the chlorinated polyethylene, the same findings are correct as in Example 1.

| No. | Description of starting products | Parts by weight | $a_k$, RT (kJ/m$^2$) | $H_c$ 30" (MPa) | Vicat (° C) | ΣbF (MPa) | Processing temperature. (° C) |
|---|---|---|---|---|---|---|---|
| II A | PVC-Type Y | 92 | 29 | 97.1 | 81 | 75.8 | 180 |
|   | CPE 2 | 8 | 10 | 97.7 | 81 | 75.3 | 190 |
|   |   |   | 8 | 98.1 | 80 | 76.2 | 200 |
| II B | PVC-Type Y | 89.5 | 30 | 99.5 | 80 | 77.2 | 180 |
|   | CPE 2 | 6.0 | 21 | 98.7 | 80 | 78.1 | 190 |
|   | EPDM 2 | 4.5 | 20 | 98.9 | 81 | 76.9 | 200 |
| II C | PVC-Type Y | 87.1 | 47 | 98.6 | 80 | 77.1 | 180 |
|   | CPE 2 | 4.0 | 28 | 98.8 | 80 | 79.7 | 190 |
|   | EPDM 2 | 8.9 | 24 | 100.1 | 80 | 80.1 | 200 |

$a_n$. RT (kJ/m$^2$) all samples unbroken.

EXAMPLE 3

In this Example a chlorinated polyethylene is used as a comparative substance, which despite 10% dosing only develops moderate notch impact strength. However, if 50% by weight of the CPE are replaced by EPDM/rubber in the form of the graft polymer used, there clearly results an improvement in respect of strength and processing resistance.

| No. | Description of starting products | Parts by weight | $a_k$, RT (kJ/m²) | $H_c$ 30" (MPa) | Vicat (° C) | ΣbF (MPa) | Processing temperature (° C) |
|---|---|---|---|---|---|---|---|
| III A | PVC-Type Y | 90 | 13 | 103.3 | 81 | 77.5 | 180 |
|  | CPE 3 | 10 | 8 | 99.4 | 80 | 87.4 | 190 |
|  |  |  | 4 | 101.9 | 81 | 80.1 | 200 |
| III B | PVC-Type Y | 83.9 | 30 | 102.9 | 80 | 76.2 | 180 |
|  | CPE 3 | 5.0 | 28 | 103.1 | 80 | 76.4 | 190 |
|  | EPDM 1 | 11.1 | 26 | 101.4 | 81 | 79.2 | 200 |

$a_k$, RT (kJ/m²) all samples unbroken

EXAMPLE 4

By varying the ratio of the graft basis to the grafted monomer in the EPDM/SAN graft polymer used, the effectiveness in combination with chlorinated polyethylene is maintained. The notch impact strength of 11 achieved in the EPDM-free comparative compound at 190° C is substantially raised by the addition of the EPDM/SAN graft polymer.

| No. | Description of starting products | Parts by weight | $a_k$, RT (MPa) | $H_c$ 30" (MPa) | Vicat (° C) | ΣbF (MPa) | Processing temperature (° C) |
|---|---|---|---|---|---|---|---|
| IV A | PVC-Type Y | 92 | 11 | 98.7 | 80 | 75.8 | 190 |
|  | CPE 1 |  |  |  |  |  |  |
| IV B | PVC-Type Y | 90.3 | 27 | 99.8 | 80 | 76.8 | 190 |
|  | CPE 1 | 4.0 |  |  |  |  |  |
|  | EPDM 4 | 5.7 |  |  |  |  |  |
| IV C | PVC-Type Y | 84.6 | 38 | 98.2 | 80 | 78.1 | 190 |
|  | CPE 1 | 4.0 |  |  |  |  |  |
|  | EPDM 3 | 11.4 |  |  |  |  |  |

$a_k$, RT (kJ/m²) all samples unbroken.

EXAMPLE 5

Chlorinated polyethylenes with relatively low chlorine content (approximately 27% by weight) can also be combined with EPDM/SAN graft polymers with a considerable improvement of strength.

| No. | Description of starting products | Parts by weight | $a_k$, RT (MPa) | $H_c$ 30" (MPa) | Vicat (° C) | ΣbF (MPa) | Processing temperature (° C) |
|---|---|---|---|---|---|---|---|
| V A | PVC-Type Y | 90 | 11 | 96.3 | 82 | 81.1 | 180 |
|  | CPE 4 | 10 |  |  |  |  |  |
| V B | PVC-Type Y | 83.9 | 26 | 98.4 | 81 | 80.2 | 180 |
|  | CPE 4 | 5 |  |  |  |  |  |
|  | EPDM 2 | 11.1 |  |  |  |  |  |

$a_k$, RT (kJ/m²) all samples unbroken.

We claim:

1. A thermoplastic moulding composition comprising:
   a. 65 to 95% by weight of polyvinyl chloride or a vinyl chloride copolymer having a K-value of 50 to 80;
   b. 2 to 25% by weight of a chlorinated polyolefin or of a chlorinated olefin copolymer with a chlorine content of 20 to 80% by weight; and
   c. 3 to 30% by weight of a graft polymer produced by grafting onto an EPDM rubber as graft base a member selected from the group consisting of styrene, α-methyl styrene, a mixture of styrene and α-methyl styrene, a mixture of styrene and acrylonitrile, a mixture of α-methyl styrene and acrylonitrile, and a mixture of styrene, α-methyl styrene and acrylonitrile.

2. A thermoplastic moulding composition according to claim 1, wherein the chlorinated polyolefin or olefin copolymer has been produced by the low pressure method and contains 20 to 60% by weight chlorine.

3. A thermoplastic moulding composition according to claim 1, wherein the EPDM graft polymer has been produced in an aromatic solvent.

4. A thermoplastic moulding composition according to claim 1, wherein during the production of the EPDM graft polymer the following conditions were maintained:

$$1 < \frac{\text{solvent}}{\text{sum of reagents}} < 10$$

$$0.5 < \frac{\text{graft base}}{\text{graft monomers}} < 2.5$$

$$1.5 < \frac{\text{Styrene}}{\text{acrylonitrile}} < 4$$

80° C ≦ polymerization temperature ≦ 140° C.

5. A thermoplastic moulding composition according to claim 1, wherein the EPDM rubber in the graft polymer contains as a diene component a member selected from the group consisting of 5-ethylidene-norbornene-2, dicyclopentadiene and hexadiene-(1,4).

6. A thermoplastic moulding composition according to claim 1, wherein the chlorinated polyolefin is selected from the group consisting of a chlorinated polyethylene, a chlorinated ethylene-propylene-copolymer, and a chlorinated ethylene-propylene-diene-copolymer.

7. A thermoplastic moulding composition according to claim 6, wherein the chlorinated polyolefin or chlorinated olefin copolymer contains 25 to 45% by weight chlorine.

8. A thermoplastic moulding composition according to claim 7, wherein the chlorinated polyolefin is polyethylene produced by the low pressure process with a molecular weight (MG) of between 10,000 and 2,000,000 and subsequently chlorinated to a level of 25 to 45% by weight chlorine.

9. A thermoplastic moulding composition according to claim 1, wherein the EPDM graft polymer comprises a mixture of styrene and acrylonitrile.

10. A thermoplastic moulding composition according to claim 1 comprising:
   a. 65 to 95% by weight of polyvinyl chloride with a K-value of 50 to 80;
   b. 2 to 25% by weight of a chlorinated polyethylene or of a chlorinated ethylene-propylene-copolymer with a chlorine content of 25 to 45% by weight; and
   c. 3 to 30% by weight of a solution polymerized graft polymer of styrene and acrylonitrile on an EPDM rubber produced by solution polymerization and having as a diene component a member selected from the group consisting of 5-ethylidene-norbornene-2, dicyclopentadiene and 1,4-hexadiene.

11. A process for preparing a thermoplastic moulding composition according to claim 1 which comprises solution graft polymerization in an organic solvent a member selected from the group consisting of styrene, α-methyl styrene, a mixture of styrene and α-methyl styrene, a mixture of styrene and acrylonitrile, a mixture of α-methyl styrene and acrylonitrile, and a mixture of styrene, α-methyl styrene and acrylonitrile, onto an EPDM rubber and mixture the resulting graft polymer in a proportion of from 3 to 30% by weight with 65 to 95% by weight of polyvinyl chloride or a vinyl chloride copolymer having a K-value of 50 to 80 and 2 to 25% by weight of a chlorinated polyolefin or of a chlorinated olefin copolymer with a chlorine content of 20 to 80% by weight.

12. A process according to claim 11, wherein the solvent is an aromatic hydrocarbon having a boiling point $bp_{760}$ of 80° to 150° C.

13. A process according to claim 11, wherein the following conditions are maintained during polymerization $$1 < \frac{\text{solvent}}{\text{sum of reagents}} < 10$$

$$0.5 < \frac{\text{graft base}}{\text{graft monomers}} < 2.5$$

$$1.5 < \frac{\text{styrene and/or } \alpha\text{-methyl styrene}}{\text{acrylonitrile}} < 4$$

and the temperature is maintained between 80° and 140° C.

14. A process according to claim 11, wherein the solvent in the production of the EPDM graft polymer is benzene in the ratio amount of:

$$1 \leq \frac{\text{solvent}}{\text{sum of reagents}} \leq 10$$

15. A process according to claim 11, wherein the solvent in the production of the EPDM graft polymer is toluene in the ratio amount of:

$$1 \leq \frac{\text{solvent}}{\text{sum of reagents}} \leq 5$$

16. A thermoplastic moulding composition prepared by the process of claim 11.

* * * * *